Figure 1:
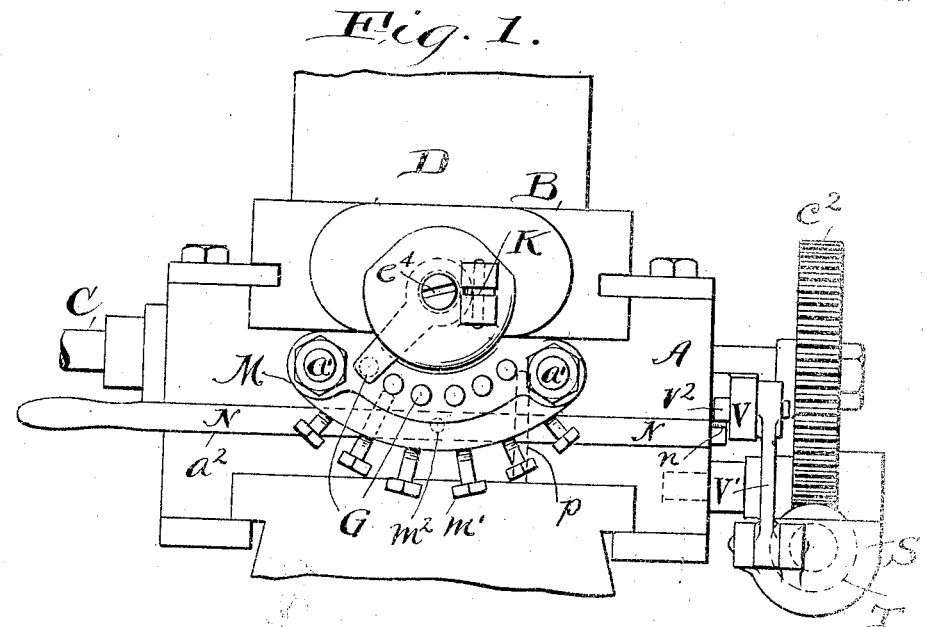

J. G. OLIVER.
INDEPENDENT STOP MECHANISM FOR TURRET LATHES.
APPLICATION FILED APR. 3, 1906.

976,904.

Patented Nov. 29, 1910.

2 SHEETS—SHEET 1.

Witnesses.
E. B. Gilchrist
H. B. Sullivan

Inventor:
John G. Oliver
by
R. Thurston Woodson
his attorney

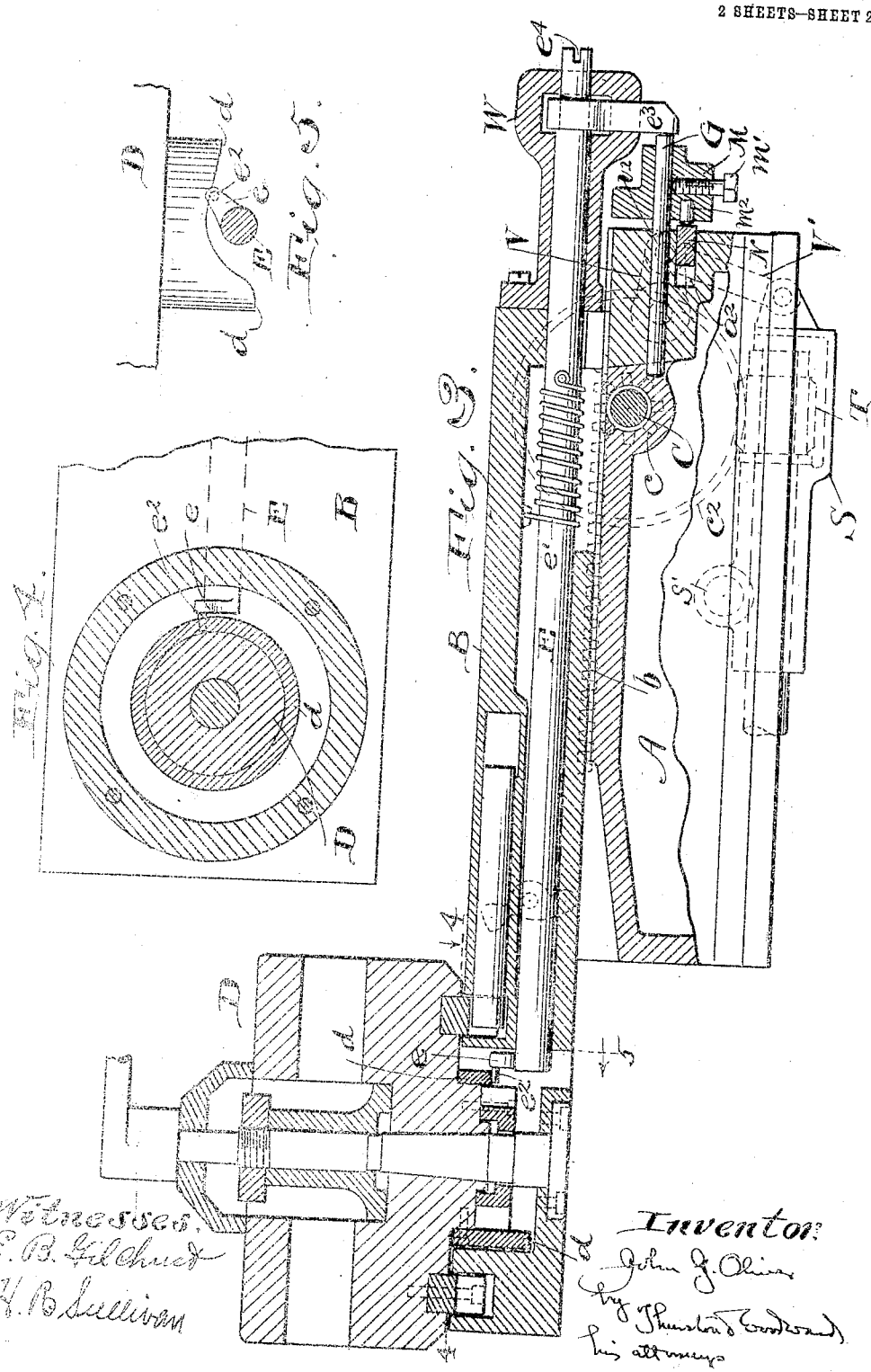

UNITED STATES PATENT OFFICE.

JOHN G. OLIVER, OF CLEVELAND, OHIO.

INDEPENDENT STOP MECHANISM FOR TURRET-LATHES.

976,904.  Specification of Letters Patent.  Patented Nov. 29, 1910.

Application filed April 3, 1906. Serial No. 309,599.

*To all whom it may concern:*

Be it known that I, JOHN G. OLIVER, a citizen of the United States, residing at Cleveland, in the county of Cuyahoga and State of Ohio, have invented a certain new and useful Improvement in Independent Stop Mechanism for Turret-Lathes, of which the following is a full, clear, and exact description.

The invention consists in the simple and novel mechanism shown in the drawing and hereinafter described and claimed, whereby the turret slide will be brought to a standstill whenever any turret tool shall have completed its work.

The invention also includes the means substantially as shown for rendering the stop mechanism inoperative for a greater or less time; and also the means for disconnecting the turret slide from the power feed when the lathe is equipped with power feed.

Figure 2:
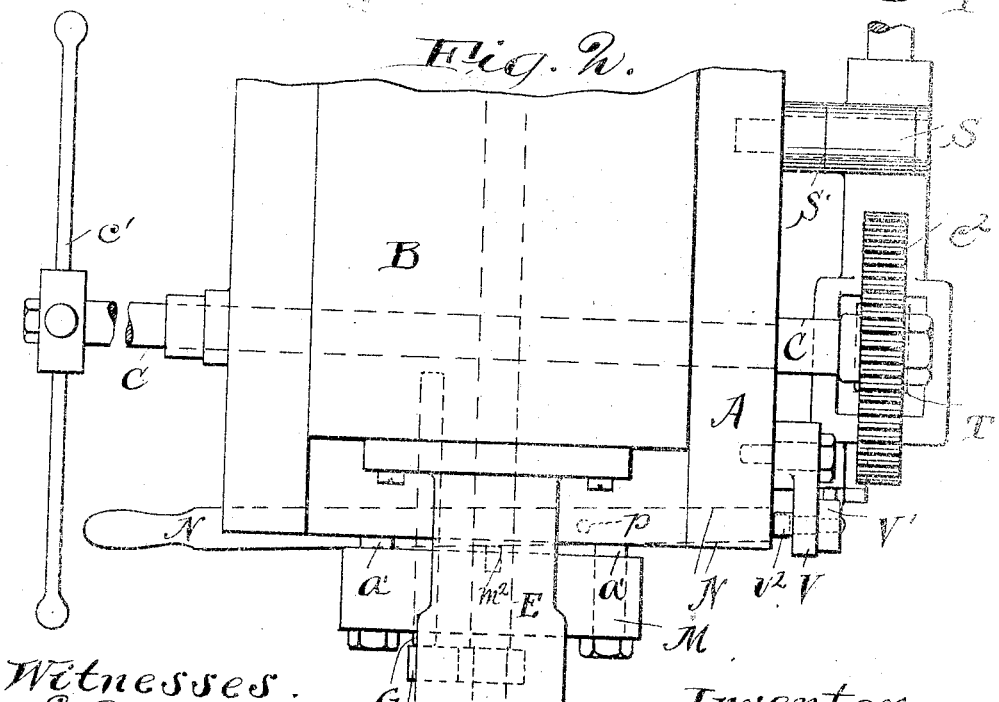

In the drawings, Figure 1 is a rear elevation of a turret lathe equipped with my invention. Fig. 2 is a plan view of the rear end of said turret lathe. Fig. 3 is a central longitudinal section of said turret lathe. Fig. 4 is a sectional plan view in the plane indicated by line 4—4 drawn on Fig. 3. Fig. 5 is an elevation of the lower part of the turret from the rear side thereof.

Referring to the parts by letters, A represents the part of a lathe on which the turret slide B is supported. This supporting member may be the bed of the machine, or a saddle adjustably secured to said bed. The slide is provided upon its under side with a longitudinal rack $b$ adapted to be engaged by a pinion $c$ on a shaft C mounted in the member A of the machine. This shaft may have on its projecting front end the wheel or handles $c'$ by which the shaft may be turned to move the turret slide B forward or backward as required.

D represents the turret which is carried at the front end of the slide B, and is mounted thereon so that it may be turned on a vertical axis to bring any one of its tool sockets into the working position in alinement with the live spindle. In machines of this kind, suitable mechanism is usually provided for automatically turning this turret so as to successively bring its tool sockets into the working position, and for locking the turret in its several working positions. Such turret turning and locking mechanism is no part of the present invention and is not shown in detail. So far as the present invention is concerned, the turret might be turned by hand. On the bottom of the turret is a cam $d$ for operating a longitudinally extended rock shaft E which is mounted in the slide B, but is incapable of endwise movement relative to said slide. A spring $e'$ may be provided for turning this rock shaft back to what may be called its initial position. The cam $d$ is for the purpose of moving said shaft, step by step, away from that initial position. The cam may operate upon any suitable mechanism which will cause the shaft E to so turn. In the construction shown, the shaft E is provided with an arm $e$ which carries a crank pin $e^2$. This pin projects beneath and into engagement with the lower face of the cam $d$. At the rear end of this rock shaft E a finger $e^3$ is fixed. This finger is incapable of movement independently of the turret slide and lengthwise of shaft E. In the construction shown the finger passes out from the shaft through a slot in a bracket piece W secured to the rear end of the turret slide, which slot is only wide enough to let said finger swing freely therein when the shaft E turns.

G G represents longitudinally extended stop bars supported directly or indirectly by the member A of the machine, these stop bars being arranged equidistantly in the arc of a circle, of which the axis of the shaft E is the center, and at a distance from that axis less than the length of the finger $e^3$. Each one of these stop bars is associated with one of the tool sockets of the turret; from which it follows that there should be as many stop bars as there are tool sockets. In the present example, six of said bars are shown, and the turret is supposed to have six tool sockets.

When the shaft E is in its normal or initial position, the finger $e^3$ is alined with the right hand stop bar G. When the turret is turned the angular distance required to bring the next tool socket thereon into working position,—that is to say, in the present instance, one-sixth of the revolution,—the cam $d$, will, during said angular movement of the turret, turn the rock shaft enough to bring the finger $e^3$ into alinement with the next stop bar G. This action will be repeated, and the rock shaft E progressively turned, as the turret is turned, until the turret is making that movement which brings it back to its first position. The part of cam $d$ which, during this final movement of the turret, will engage with pin $e^2$, is steeply cut away thereby allowing spring $e'$ to return the rock shaft E to its initial position.

It is sometimes desirable to put these automatic stop bars out of action, so that an operator may move the turret slide forward beyond the position in which it would otherwise be stopped by said stop bars. In the present construction, this may be accomplished by turning the finger $e^3$ to the left (as viewed from the rear end of the machine) until it is past the last or left hand stop bar G. It may be locked in this position by any suitable means, as for example, by means of a latch lever K pivoted to the end of the turret slide and adapted to be swung into a transverse notch $e^4$ in the end of the rock shaft E.

When the lathe is not equipped with a power feed to move the turret slide forward, the stop bars G may be secured to an immovable part of or attachment to the base plate; as if for example, the block M (to which they are adjustably secured by set screws $m$) were immovably fastened to the bed plate. If, however, the machine is to employ a power feed, that is to say, mechanically driven means for turning shaft C, it is necessary to provide also means whereby the power feed is disconnected from said shaft C before the turret slide is positively stopped. To effect this result, the specific construction shown in the drawing is provided. That is to say, the said block M is hung on two horizontal bolts $a'$ $a'$, on which said block may slide a short distance before being brought to rest by engagement with the bed A.

A lever N is pivoted as at $p$ to the bed plate in a slot $a^2$ therein; and this lever may be connected by any suitable means with any suitable clutch or other analogous device in the train of mechanism connecting shaft C with the power. This slot $a^2$ and lever are in the plane of movement of block M; and when the shaft C is connected with the power, said lever projects out of said slot into the position shown in Figs. 1 and 3. To disconnect said clutch, it is necessary to swing the lever forward into said slot $a^2$. This block M carries a hardened steel pin $m^2$ adapted to engage with the lever N.

When the turret slide, moving in the working direction, brings the finger $e^3$ against one of the stop bars G, the first effect is to push said bar and thereby move the block M until further movement is prevented by the engagement of the block with the end of the bed plate. During this movement, the pin $m^2$ pushing against the lever N pushes it into the slot $a^2$, and the said lever, by so moving disengages shaft C from the power. The power feed being thus disconnected, the slide may be and will be stopped in the desired position, namely, that position which it will occupy when block M is in an engagement with the bed plate, and the finger $e^3$ is in an engagement with the proper stop bar G.

In the specific construction shown a worm wheel $c^2$ is secured to shaft C. A worm T normally engages with and rotates said worm wheel. This worm which may be constantly rotated by any suitable mechanism is mounted in a box S which is pivoted to the side of the lathe bed. A link V' connects this box with a lever V pivoted also to the bed. On this lever is a pin $v^2$ having a beveled face which may be engaged by a beveled face pin $n$ on lever N. When the lever N is in the position shown in Fig. 2 these two beveled faces by their engagement have caused box S to be raised so that the worm T is in engagement with the worm wheel $c^2$. When lever N is pushed into slot $a^2$, as before explained, the box S will be swung down by gravity so as to disconnect it from the worm wheel $c^2$.

The specific releasable connection between shaft C and the power feed is not an essential of the invention herein described and claimed.

Having described my invention, I claim:

1. In a turret lathe, the combination of a turret slide, a support therefor, a turret on said slide, releasable power mechanism for feeding the turret slide, a longitudinal rock shaft upon the turret slide, a finger secured to the rear end of said rock shaft and incapable of moving lengthwise thereof independently of the slide, two horizontal guide bars secured to the rear end of the slide support, a block slidably supported upon said guide bars, a series of independently adjustable stops supported by said block in the range of said finger, a lever pivoted to said bed on a vertical pivot and projecting between the block and the end of the bed, a mechanism controlled by said lever for disengaging the power feeding mechanism from the turret slide.

2. In a turret lathe the combination of a turret slide, a support therefor, a turret on said slide, a longitudinal rock shaft mounted upon the turret slide, a finger secured to the rear end of said rock shaft, mechanism transmitting motion from the turret to the rock shaft, a series of longitudinally extended stop bars in the range of said finger and adjustably connected with the support for the slide, and a latch for holding said finger out of line with any of said stop bars.

In testimony whereof, I hereunto affix my signature in the presence of two witnesses.

JOHN G. OLIVER.

Witnesses:
E. L. THURSTON,
E. P. GILCHRIST.